United States Patent
Miyauchi et al.

(10) Patent No.: US 6,487,156 B2
(45) Date of Patent: *Nov. 26, 2002

(54) INFORMATION RECORDING APPARATUS FOR RECORDING A RECORDING SIGNAL AND A DUMMY SIGNAL ADDED TO A LEADING AND/OR TRAILING SIDE OF THE RECORDING SIGNAL

(75) Inventors: Yasushi Miyauchi, Akishima (JP); Motoyasu Terao, Tokyo (JP); Akemi Hirotsune, Higashimurayama (JP); Hiroyuki Minemura, Kodaira (JP); Harukazu Miyamoto, Kodaira (JP)

(73) Assignees: Hitachi, Ltd., Tokyo (JP); Hitachi Maxell, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/105,276

(22) Filed: Mar. 26, 2002

(65) Prior Publication Data

US 2002/0097654 A1 Jul. 25, 2002

Related U.S. Application Data

(63) Continuation of application No. 09/963,366, filed on Sep. 27, 2001, now Pat. No. 6,385,153, which is a continuation of application No. 09/629,867, filed on Aug. 1, 2000, now Pat. No. 6,317,408, which is a continuation of application No. 09/412,787, filed on Oct. 5, 1999, now Pat. No. 6,111,850, which is a continuation of application No. 09/188,370, filed on Nov. 10, 1998, now Pat. No. 5,974,023, which is a continuation of application No. 08/892,657, filed on Jul. 15, 1997, now Pat. No. 5,878,021, which is a continuation of application No. 08/678,070, filed on Jul. 10, 1996, now Pat. No. 5,703,867.

(30) Foreign Application Priority Data

Jul. 21, 1995 (JP) .............................. 7-185294
Dec. 13, 1995 (JP) .............................. 7-324200

(51) Int. Cl.[7] ................................. G11B 5/76
(52) U.S. Cl. ................................ 369/59.25; 369/124.07
(58) Field of Search ........................... 369/47.15, 47.19, 369/47.28, 53.2, 53.31, 53.37, 53.41, 59.25, 124.04, 124.08, 124.07, 275.1, 275.2, 275.3

(56) References Cited

U.S. PATENT DOCUMENTS

| | | | |
|---|---|---|---|
| 4,607,290 A | 8/1986 | Murakami |
| 4,734,901 A | 3/1988 | Murakami |
| 4,964,128 A | 10/1990 | Sako et al. |
| 5,138,599 A | 8/1992 | Fukushima et al. |
| 5,151,893 A | 9/1992 | Yamasaki et al. |
| 5,210,734 A | 5/1993 | Sakurai |
| 5,388,105 A | 2/1995 | Takagi et al. |
| 5,450,381 A | 9/1995 | Tskuamura et al. |
| 5,517,481 A | 5/1996 | Kobayashi |
| 5,615,193 A | 3/1997 | Kobayashi et al. |
| 5,703,853 A | 12/1997 | Horigome et al. |
| 5,809,004 A | 9/1998 | Kobayashi et al. |
| 5,923,640 A | 7/1999 | Takemura et al. |
| 5,953,299 A | 9/1999 | Miyamoto et al. |

FOREIGN PATENT DOCUMENTS

| | | |
|---|---|---|
| JP | 2-297724 | 12/1990 |
| JP | 3-150725 | 6/1991 |
| JP | 4-153919 | 5/1992 |
| JP | 4-212718 | 8/1992 |
| JP | 8-7276 | 1/1996 |
| JP | 2000-132838 | 5/2000 |

*Primary Examiner*—Paul W. Huber
(74) *Attorney, Agent, or Firm*—Mattingly, Stanger & Malur, P.C.

(57) ABSTRACT

A recording medium having a dummy signal area on at least one side of a recording area is used and information is recorded with a dummy signal added to at least one of the leading and trailing sides in the recorded information signal. The user data area remains unaffected by repeated overwriting so that recorded user data is reproduced correctly. In particular, the wave form distortion caused by fluidization of a recording film remains at the dummy signal area and does not affect the user data area, so that the reproduction of the target information (user data) is assured.

4 Claims, 4 Drawing Sheets

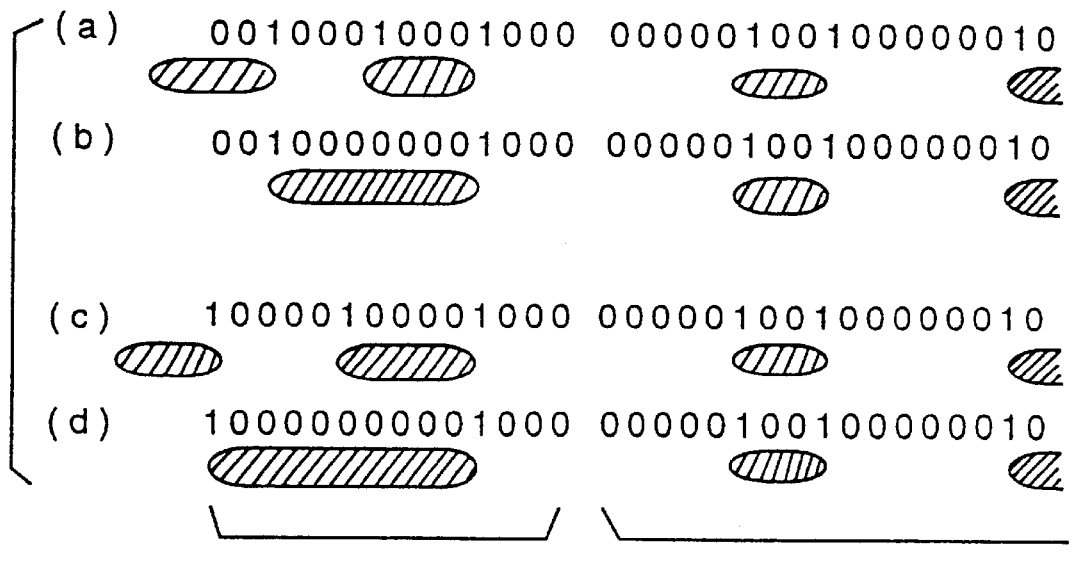
FIG. 5
| MARK LENGTH | SPACE LENGTH | NUMBER OF REPETITION | MARK LENGTH | SPACE LENGTH | NUMBER OF REPETITIONS |
|---|---|---|---|---|---|
| 1 B | 1 B | 1 B | 1 B | 1 B | 1 B |
FIG. 6 (a)
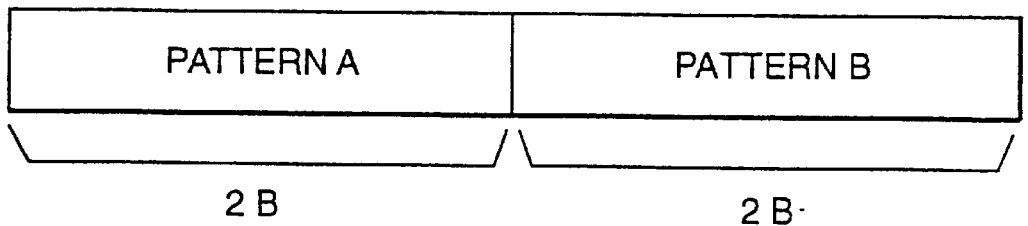
FIG. 6 (b)

INFORMATION RECORDING APPARATUS FOR RECORDING A RECORDING SIGNAL AND A DUMMY SIGNAL ADDED TO A LEADING AND/OR TRAILING SIDE OF THE RECORDING SIGNAL

This is a continuation application of U.S. Ser. No. 09/963,366, filed Sep. 27, 2001, now U.S. Pat. No. 6,385,153; which is a continuation of U.S. Ser. No. 09/629,867, filed Aug. 1, 2000, now U.S. Pat. No. 6,317,408; which is a continuation application of U.S. Ser. No. 09/412,787, filed Oct. 5, 1999, now U.S. Pat. No. 6,111,850; which is a continuation application of U.S. Ser. No. 09/188,370, filed Nov. 10, 1998, now U.S. Pat. No. 5,974,023; which is a continuation application of U.S. Ser. No. 08/892,657, filed Jul. 15, 1997, now U.S. Pat. No. 5,878,021; which is a continuation application of U.S. Ser. No. 08/678,070, filed Jul. 10, 1996, now U.S. Pat. No. 5,703,867.

FIELD OF THE INVENTION

The present invention relates to an information recording medium, an information recording method and an information recording apparatus which are capable of recording such information in real time by means of recording beams, for example, laser beams as digital information including pulse-frequency modulated analog signals of projected images and voice, data in electronic computers, facsimile signals and digital audio signals. More particularly, the present invention relates to a disk shaped recording medium using an erasable, phase-change type optical recording film.

BACKGROUND OF THE INVENTION

Conventional phase-change type optical disks have a recording film capable of fast erasure by crystallization that is materialized within a time substantially equal to the time required for a recording laser beam to pass on a point on a disk, for example. The conventional method of recording and erasing information to and from such an erasable recording film is to change the power of the laser beam between two levels higher than the reading power levels, these levels are a high power level and an intermediate power level. The advantage of this method is that the so-called overwriting (replacing old information with new without prior erasing) is possible. When such overwriting is repeated a plurality of times, however, the laser beam irradiates the recording film repeatedly in accordance with the recording information signal. This results in a high probability of allowing VFO recording marks to be repeatedly written to the same place in an area close to a preformat section in particular, and therefore variations in film thickness tend to occur locally because of recording film fluidization.

According to Japanese Unexamined Patent Publication No. 150725/1991, a method that avoids the recording film from being repeatedly written at the same place involves shifting the data write start position each time data is written or at appropriate times when old data is overwritten, whereby markforming positions are properly distributed. Thus the overwriting cyclability of the optical disk are improved.

SUMMARY OF THE INVENTION

Even when information is recorded on the phase-change type optical disk as in the prior art, the fluidization of the overall recording film inevitably occurs as overwriting is repeated a plurality of times because the temperature distribution in the laser beam is asymmetrical. Consequently, a change in the thickness of the recording film is brought about in that the film becomes thick on one side and thin on the other side (the initial or terminal end portion of a recording area taken from the perspective of the direction of recording) or the film becomes thick at the center portion of the recording area and thin at the starting and ending areas, so that the distortion of the reproducing signal waveform also occurs. The latter type of thickness change is more difficult to stop. Therefore, there arises a problem of making the area having the waveform distortion expand as the number of overwriting times increases. In the case of an erasable digital video disk, moreover, mark edge recording may be used with both edges of a recording mark provided with information for the purpose of increasing density. When such a mark edge recording system is employed, deterioration due to fluidization is further evident because a long mark is repeatedly recorded.

An object of the present invention intended to solve the foregoing problems in the prior art is to provide an information recording medium, an information recording method and an information recording apparatus that ensure reproduced signals properly corresponding to recorded information signals.

According to the present invention, a recording medium capable of recording or overwriting information with a laser beam is provided. The recording medium has a preformatted area in which information such as a track address has been formed with pits or with recording marks resulting from a phase change. In addition to the preformatted area, a gap area, a recordable area such as a VFO/SYNC area and a user data area are reserved. Moreover, a dummy area is provided on at least one of the sides before and after the recording area. A part of the VFO area can be used instead of the front dummy area, by making the VFO area long. Further, a buffer area to allow for a margin for the rotational jitter of a motor is located just after the dummy area. In this case, one of the objectives for the provision of the dummy area is to prevent information actually read from the user data area from being damaged even though repeated overwriting causes the fluidization of the recording film. Such damage is prevented because the distortion of a reproduced signal waveform is confined to the VFO/SYNC area and/or the dummy area. Further, the dummy area is preferably set to be longer than the maximum shift width of a position where the writing of a recorded information signal is started. Further, it is preferable to add a pit array (data area postamble) depending in accordance with applicable standards before this dummy area to avoid the mark and the space from being inverted.

According to the invention, recording is made by adding a dummy signal to at least the front or rear side of a target (recorded) signal such as VFO, SYNC and user data. It is preferable to add the dummy signal to the rear side (the trailing side with respect to the direction of recording) when a dummy signal is added to only one side of the target signal. In this case, the dummy signal is chiefly recorded in the dummy area.

Further, according to the invention, the fluidization of the recording film resulting from repeated overwriting can be moderated by setting the average energy of the laser beam during dummy signal recording to be lower than that during the target information signal recording. Consequently, the distortion of the reproduced signal waveform due to the fluidization slightly occurs in the dummy area where the dummy signal is recorded and in part of the buffer area. However, the recording area where the target signal is recorded remains unaffected by the fluidization to ensure that a reproduced signal correctly corresponding to the target signal is obtained. Collectively, the sum of the dummy area and the buffer area can be called a buffer area.

For the recording of the dummy signal, the average energy thereof may be lowered, for example, by adjusting the duty ratio of a single-frequency signal. In a mark edge recording system, the duty ratio of the dummy signal may be set to not greater than 50% because the average duty ratio is about 50%. The duty ratio of at least a part of the dummy signal is preferably in a range of at least 10% to about 40%, and more preferably in a range of at least 20% to about 30%. Moreover, the average energy of the laser beam during the recording of the dummy signal may be decreased stepwise or linearly by adjusting the duty ratio of the dummy signal stepwise or linearly; or otherwise the recording power may be varied. It is more preferred to vary the duty ratio of the dummy signal than to vary the recording power in order to simplify the apparatus. The dummy signal may be added to either the front or rear side of the recording information signal, that is mainly VFO, SYNC, and user data, depending on the recording media characteristics. In the preferred case of adding the dummy signal to only one side, the dummy signal is added to only the rear side of the recorded information signal rather than the front side where the VFO has a function of the dummy signal.

The distortion level of the reproduced signal waveform can also be lowered by shifting the start position of writing the recorded information signal to effect overwriting. In this case, the maximum shift width is preferably set to be shorter than the dummy signal that is added; particularly, it is preferably set to be approximately $\frac{1}{20}$ to $\frac{1}{2}$ of the length of the recorded dummy signal.

Also according to the present invention the recording medium stores thereon information concerning the pattern of the dummy signal that is used, for example the duty cycle of the dummy signal. For example, it is preferred that such information be recorded in the control data area of the recording medium.

Recording films utilizing a phase change such as recording films of a Ge—Sb—Te system and a Ag—In—Sb—Te system may be used according to the present invention. The use of a recording film containing a high-melting point material such as Cr—Te and Ag—Te whose melting point is higher than that of the main component material and a recording medium with an Si/metal double reflective layer is preferred because the recording film thickness is further restrained from varying because of fluidization.

Still further, according to the present invention, information is recorded by an information recording apparatus including: a laser beam source, an optical system, automatic focusing (AF) means, tracking means, reproduced signal detection means, means to read information in a control data area, a recording medium on which information on a pattern of a dummy signal to be added to at least one of the leading or trailing sides of a recorded information signal is recorded beforehand, means for rotating or moving the recording medium, means for condensing laser beams from the laser beam source on the recording medium, signal modulating means for converting a signal to be recorded into a modulation code, means for adding the dummy signal as set forth herein, recording waveform generation means for generating a recording waveform corresponding to the recording code with the dummy signal added, recording start position control means for shifting a recording start position at random (preferably wherein the maximum shift width of the recording start position, for example, expressed in a unit of Bytes is shorter than the length of the dummy signal expressed in a unit of Bytes), laser driving means for driving the laser beam source in accordance with the recording waveform, means for converting the intensity change of the laser beam reflected from the recording medium into an electrical signal, means for amplifying the reproduced electrical signal, binary conversion means for converting the electrical signal into a binary waveform, means for deleting the dummy signal, and means for decoding the binary signal to make the decoded signal an information signal (user data).

BRIEF DESCRIPTION OF THE DRAWINGS

FIG. 5 is a diagram of an example of the data area postamble and the dummy data according to the invention; and FIGS. 6(a) and 6(b) are diagrams of examples of the dummy data pattern according to the invention.

DETAILED DESCRIPTION OF THE PREFERRED EMBODIMENTS

Figure 1:
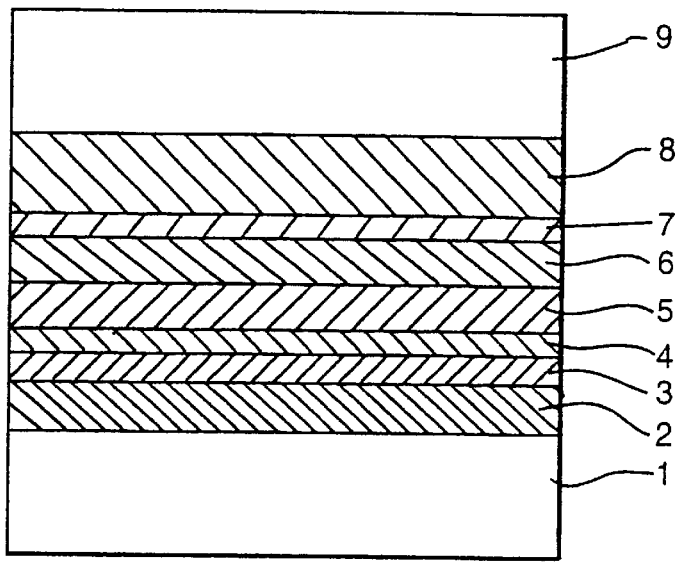
FIG. 1 is a partial sectional view of a disk embodying the present invention.

A detailed description will subsequently be given of the preferred embodiments of the present invention.

The recording film for use in the present invention is preferably a crystal-amorphous phase-change optical recording film capable of fast crystallization, a recording film utilizing an amorphous-amorphous change, a crystal-crystal phase-change (e.g. a change in the crystal system and particle size) recording film or a magneto-optic recording film. However, any other recording film which has a tendency to have waveform distortion at the beginning and/or the end of a recording area may also be used.

In addition to the preformatted area and a gap area, a recording area such as the VFO/SYNC area and the user data area capable of recording information are provided. Moreover, the dummy area is provided on at least one of the leading or trailing sides located respectively before and after the recording area, and this dummy area serves to prevent information actually read from the data area from being damaged even though repeated overwriting causes the fluidization of the recording film. The damage is prevented because the distortion of the regenerative signal waveform resulting from the fluidization thereof is confined to the VFO area, the dummy signal and/or the buffer area.

A description will subsequently be given of the functions in a case where a recording medium is used in which forward fluidization (the recording film is fluidized in the same direction as the direction in which the laser beam proceeds along the surface of the disk) is caused therein by a plurality of overwritings. The sector format of the recording medium used herein includes the preformatted area, the gap area, the front dummy area, the recording data area, the rear dummy area and the buffer area arranged in this order. The recording data area is formed with the VFO/SYNC area and the user data area. At this time, the shift width at the recording start position is made shorter than the length of the dummy area to ensure that the recorded information signal is correctly reproduced. When overwriting is repeated a plurality of times on the recording medium, fluidization occurs and the fluidized portion of the recording film moves from the beginning or leading side to the trailing or ending side of the recording area. Therefore, the reproduced signal level varies.

In this recording medium, a reflectance first decreases, then increases as the recording film becomes thinner and increases as it becomes thicker. In other words, the reflectance first decreases then increases on the leading side where the recording film becomes thin, whereas it increases on the trailing side where the recording film becomes thick. Therefore, the distortion of the reproduced signal waveform occurs on the leading and trailing sides of the recording area, thus causing errors. However, the error generation resulting from repeated overwriting can be eased by adding the dummy signal to at least one of the leading or trailing sides respectively before or after a target information signal such as the VFO/SYNC and data signal recording area and by making the average energy of the dummy signal lower than that of the recorded user data signal. At the time of the reproduction then, only the reproduced signal waveform corresponding to the user data signal is reproduced, whereby the user data recording area remains unaffected by the fluidization even though the reproduced waveform distortion in the dummy signal area and/or that of the buffer area occur to ensure that the user data signal is reproduced correctly. Further, no great distortion is caused in the reproduced signal waveform of the recorded user data signal even if the number of overwritings increases.

In this case, the average energy of the laser beam during the dummy signal recording may be lowered by, for example, recording the dummy signal with a single-frequency signal and decreasing the duty ratio of the signal. In the mark edge recording system, the duty ratio of the dummy signal may be set to not greater than 50% because the average duty ratio of the user data is about 50%. In the case of a disk causing the forward fluidization, the duty ratio of the dummy signal should preferably be decreased further to as low as 25%. Moreover, the average energy of the laser beam during the dummy signal recording may be decreased stepwise or consecutively by adjusting the duty ratio of the dummy signal stepwise or linearly; or otherwise, the laser power level may be varied instead of the duty ratio.

Although the average laser beam energy can be decreased by varying the pulse width of the recording waveform and/or the power that is used, it is preferred to vary the duty ratio of the dummy signal because the apparatus is simplified. The dummy signal may be added to either the front (leading) or rear (trailing) side or both of the recorded information signal as occasion demands. In this case, the dummy signal may be added to only the rear (trailing) side of the recorded information signal rather than the front side thereof where the VFO signal has a similar function as that of the dummy data signal.

Although the invention is disclosed with respect to a disk medium embodiment, any other recording medium in the form of not only a disk but also a card and the like is applicable to the present invention.

FIG. 1 is a partial sectional view of a disk used according to a preferred embodiment of the invention. First, a ZnS—SiO$_2$ dielectric layer 2 about 125 nm thick is formed by magnetron sputtering on a polycarbonate substrate 1 for a continuous tracking servo, the substrate 1 having a diameter of 5 inches and a thickness of 0.6 mm. Subsequently, a recording film 3 of Cr$_5$Ge$_{20}$Sb$_{20}$Te$_{55}$ is formed to about 30 nm thickness on the ZnS—SiO$_2$ dielectric layer 2 and additionally a ZnS—SiO$_2$ dielectric layer 4 about 20 nm thick is formed on the recording film 3. Further, an Si layer 5 is formed to about 100 nm thickness on the dielectric layer 4 and then an Al—Ti-alloy reflective layer 6 about 100 nm thick is formed on the Si layer 5.

The formation of these film layers is carried out successively by one and the same sputtering apparatus. Further, an ultraviolet-light-hardening resin layer 7 is applied onto the alloy reflective layer 6 and then a hot-melt adhesive layer 8 is used to adhere a protective layer 9 securely onto the ultraviolet-light-hardening resin layer 7. In this case, it is possible to obtain a bonded disk having a recording capacity twice as large as that of the above bonded laminate by bonding, in place of the protective plate 9, another disk as a combination ranging from the polycarbonate substrate 1 up to the ultraviolet-hardening resin protective layer 7.

Figure 2:
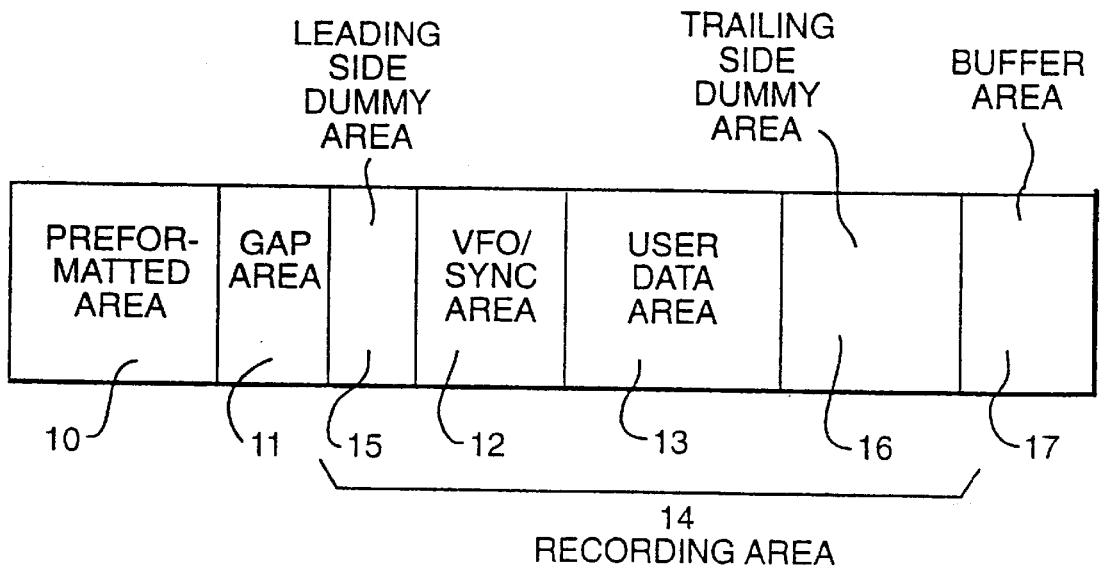
FIG. 2 is a diagram of an exemplary sector format according to an embodiment of the invention.

FIG. 2 shows an example of a sector format of the substrate used according to the preferred embodiment of the invention. The sector format includes a preformatted area 10 where information such as sector and track addresses are formed as uneven pits. In addition to the preformatted area 10 which is a read-only area, a gap area 11 and a recording area 14 (group section) such as a VFO/SYNC area 12 and a user data area 13 capable of being recorded (including overwriting) with information are provided.

According to this embodiment of the invention, moreover, dummy areas 15, 16 are provided at the beginning and the end in the recording area, respectively. Further, a buffer area 17 providing a margin for a rotational jitter is also provided behind the dummy area 16 which follows the recording area. The dummy areas 15, 16 serve to prevent information that is read from the user data area 13 from being damaged even though repeated overwriting causes the fluidization of the recording film. This damage is prevented because the distortion of a reproduced signal waveform resulting from the fluidization thereof is confined to only the front-side dummy area 15 before the VFO/SYNC area and further because the distortion of the reproduced signal waveform resulting therefrom is confine to the rear-side dummy area 16 behind the user data area. In this case, the dummy areas 15, 16 are set to be longer than the maximum shift width at a position where the writing of a recording signal is started, and the rear-side dummy area 16 whose recording film thickness varies greatly due to the fluidization is set to be longer than the front-side dummy area 15. According to recording media characteristics, such a dummy area for restraining the effect of fluidization may be provided on either front or rear side, and preferably on the rear side if it is to be provided on only the one side.

In this embodiment, a dummy signal is added, as an example, to both sides of a recorded information signal by a time length of 500 Tw (1 Tw: 90 ns, wherein Tw represents a reproduced signal detection window width). Further, in this embodiment, a recording start position is shifted at random within a range of 360 Tw. In this case, the dummy signal is mainly recorded in the dummy area. In order to moderate the fluidization of the recording film resulting from repeated overwriting, moreover, the average energy of the dummy signal is set to be lower than that of the user data signal; in other words, affected area by the fluidization is made to increase gradually.

In practice, a single-frequency (recording pulse period: 10 Tw) signal is used for the dummy signal and the duty ratio of the signal is set low. In the case of a mark edge recording method, the duty ratio becomes substantially equal to 50% in terms of the average energy when the recording is made at the single frequency. Consequently, the duty ratio of the dummy signal is preferably not greater than 50%.

Since the recording film is fluidized in the same direction as the direction of the laser beam (forward fluidization) due to repeated overwriting on the disk of this embodiment according to the invention, the duty ratio is set as low as 30%. The effect of adding the dummy signal was noticeable when the duty ratio was at least 10% and up to and including 40%. The effect was especially pronounced when the duty ratio was in the range of at least 20% up to and including 30%, whereby the effect of fluidization of the recording film was significantly eased with the effect of enlarging the recording power margin. Moreover, the average energy of the laser beam during dummy signal recording, may, according to various conditions, be decreased stepwise or linearly. In this embodiment, the recording laser pulse corresponding to a recording mark was divided into a plurality of pulses by a recording waveform generator. Thus the laser pulse duty was less than 50% even for the recording of the user data.

The reproduced signal waveform distortion due to fluidization has been reduced by randomly shifting the write start position of the recorded information signal by an amount approximately equal to 1/20 to 1/2 of the dummy signal area.

Information on the pattern of the dummy signal (e.g., information on a single-frequency pattern in which the average recording mark length recorded by the dummy signal becomes shorter than the average space length between the recording marks, etc.) is recorded with pits beforehand in the control data area of the disk in this preferred embodiment of the invention; thus recording is made according to this information.

Compared to a Ge—Sb—Te or Ag—In—Sb—Te recording film to which no high-melting point material such as Cr—Te has been added, a recording film containing a high-melting point material such as Cr—Te and Ag—Te, for example, $Ag_2Te$ is preferred because the recording power margin for moderating the fluidization is attainable to a great extent, though the use of the recording waveform with the dummy signal added thereto has the effect of suppressing the effect of fluidization.

Figure 3:
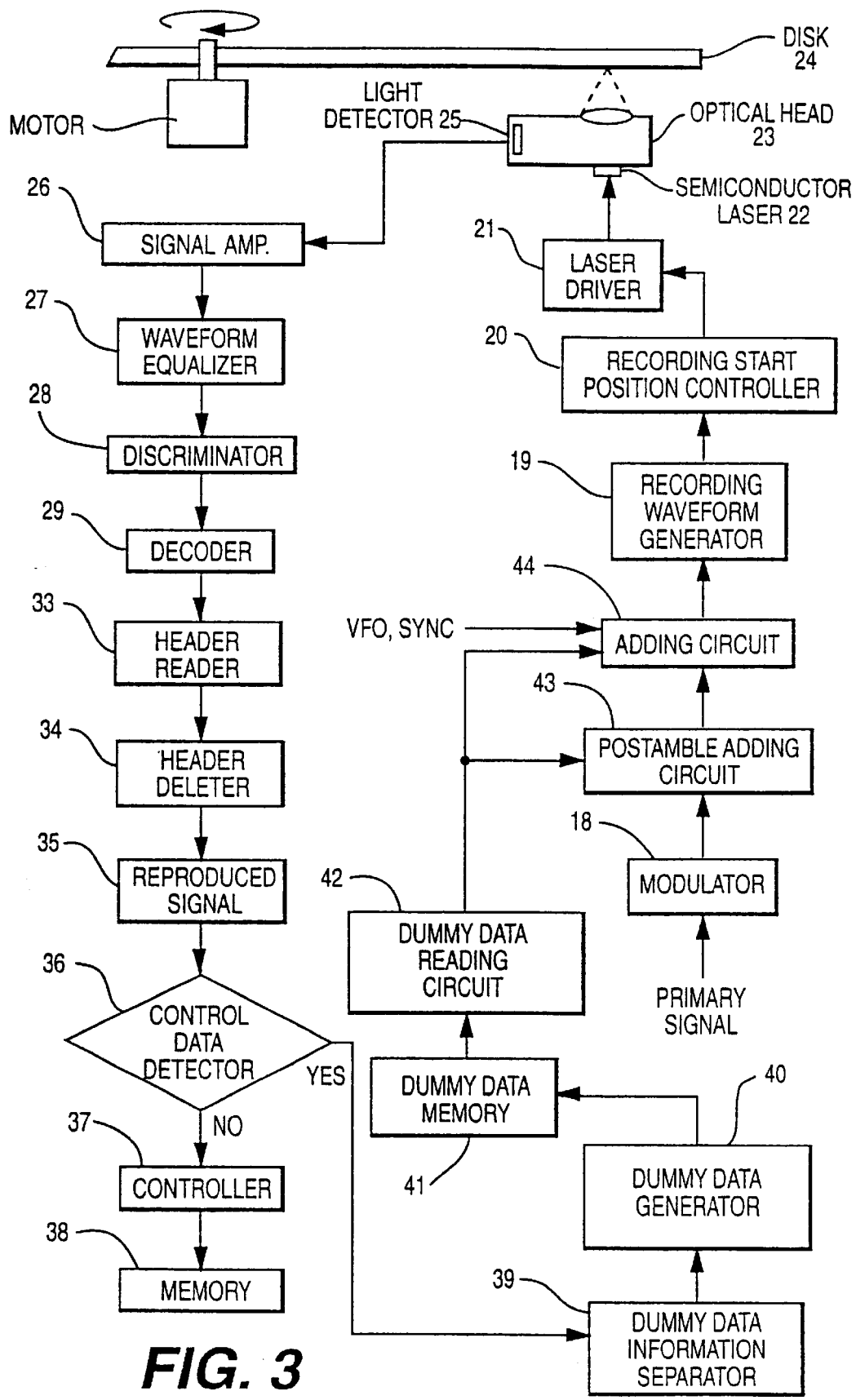
FIG. 3 is a block diagram of an information recording apparatus according to an embodiment of the invention.

FIG. 3 is an exemplary block diagram of a record playback system in a record playback apparatus embodying the present invention. Before the recording, dummy data is generated according to information stored in the control data concerning the dummy data pattern, then the dummy data is stored in a memory 41. At the time of recording, the primary signal to be recorded (user data) is fed into a modulator 18 in which it is converted into a modulation code. The dummy data generated and stored in the dummy data memory 41 is read out through the dummy data pattern reading circuit 42 and added to the user data with an adder 43. Further, VFO and SYNC signals are added with an adder 44. Also, the pulse signal from the adder is passed through a recording start position controller 20 for shifting a recording start position of the recording signal at random. Then a recording waveform corresponding to a target recording code is formed by a recording waveform generator 19 before being output as recording pulse signals. A laser driver 21 modulates the driving current of a semiconductor laser 22. Further, a disk 24 is irradiated with a condensed laser beam via an optical system in an optical head 23, so that a recording mark is formed. It is understood that although the apparatus is disclosed schematically, it includes elements such as an automatic focusing (AF) means and tracking means as part of the transducing system generally referred to as the optical head 23.

At the time of playback on the other hand, the intensity change of the laser beam reflected from a target address on the disk 24 is received by a light detector 25 in which the laser beam is converted into an electrical signal. Then the electrical signal is input via a reproduced signal amplifier 26 to a waveform equalizer 27. Then, the binary signal is formed by a discriminator 28 and decoded by a decoder 29 into a data bit string (information). Next, a preformatted area (header) of a target address is detected and analyzed by header reader 33. Then, the dummy signal and header are deleted by dummy signal and header deleter 34, and a reproduced user data signal 35 is obtained.

Next, it is determined if the reproduced signal represents control data by a control-data detector 36. If the reproduced signal contains control data including information on the dummy data pattern, the dummy data information is picked up from the control data by dummy data information separator 39. Then, the dummy signal is generated according to the information (dummy data) on the dummy data pattern by dummy data pattern generator 40. If the reproduced signal is not control data, the data is stored in memory 38 through reproduced user data controller 37.

As a modification of the embodiment disclosed with respect to FIG. 3, a bit array (data area postamble) can be added by postamble adding circuit 43 before the dummy data recorded in the dummy area 16, and the inversion of the ratio of the recording mark and the space for the dummy signal can be avoided. The postamble pattern is generated in accordance with the user data to be recorded and is added to the user data by adder 43 at the position just after the user data in the direction of recording.

Figure 4:
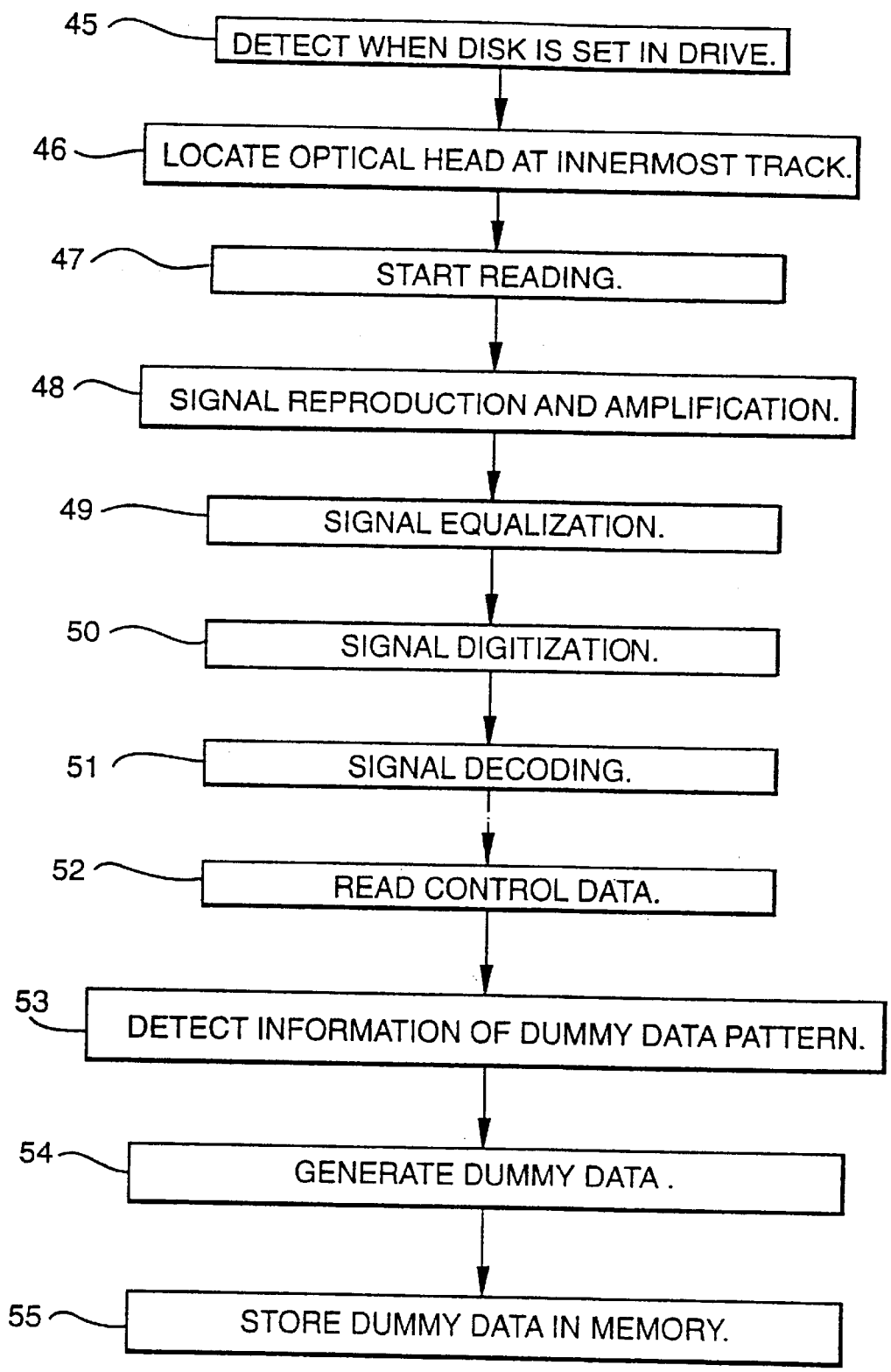
FIG. 4 is a flow chart showing the steps followed in generating the dummy data by reading information on the dummy data pattern from a disk after the disk is inserted in the apparatus of the invention.

FIG. 4 shows a flow chart of the steps followed when a disk is inserted in the record playback apparatus of the present invention. First, in step 45, it is detected that the disk is set in the drive by an optical or mechanical sensor. Then, the optical head is moved to, for example, the innermost area of the disk in step 46 and reading information starts in step 47. In step 48, the reproduced signal is read out and amplified from the rotating disk, and then the wave form generated thereby is equalized, digitized and decoded in steps 49–51, respectively. The control data is extracted by deleting the synchronizing signal, etc. in step 52 and in step 53 the information of the dummy data pattern is taken from the control data. Such information (dummy data) includes, for example, the specification of the duty ratio of the dummy signal to be recorded being added to the user data. In step 54, the dummy data pattern is generated and stored in step 55 in a memory so that the dummy signal can be added when user data is to be recorded.

An example of the data area postamble is shown in FIG. 5 as 31 and the dummy data as 32. Patterns (a) and (b) show the case where the end of the user data is a binary "0", and patterns (c) and (d) show the case where the end of the user data is a binary "1". Accordingly, patterns (a) and (c) show the case where the end of the user data is a mark. Patterns (b) and (d) show the case where the end of the user data is a space. It is preferable if the postamble is provided according to the known signal modulation standard.

An example of recording the information on the dummy data pattern in the control data area is shown in FIG. 6(a). The dummy signal area is divided into two sub areas, and the dummy signal pattern information area in the control data area is also divided into two sub areas; each sub area being divided into three sections. A mark length, expressed in units of Tw, is recorded using 4 bits in the first section. A space length, which is expressed in units of Tw, is recorded using 4 bits in the second section. The number of repetitions of these marks and spaces is recorded using the following 8 bits (1 byte). Then, a mark length, a space length, and the number of repetitions in the second sub area is recorded using 16 bits. Thus, the whole pattern of the dummy data expressed by marks and spaces is represented by 4 bytes of control data.

In other examples, a single repetition pattern of a mark and a space can be written in the dummy data pattern information area, or 3 patterns can be written dividing the dummy data area into 3 sub areas. When the dummy data area is divided into more than 4 areas, the required space to represent the patterns in the control data area exceeds 4 bytes.

As another example, the basic mark and space arrangement, which is repeated in the first sub area of two sub areas in the dummy data area, is recorded in the control data area using 2 bytes in the same manner as in the dummy data area, and the basic mark and space arrangement in the second sub area is recorded using the following 2 bytes as shown in FIG. 6(b). In this method, 4 bytes are used in the control data area to represent the pattern in the dummy data when the number of sub areas is two, and more than 4 bytes are used when the number of sub areas are more than 3 just like the former example.

Although a description has been given of the continuous servo system by way of example, the same effect is achievable with a sampled servo system in a like manner as set forth herein. Further, although a laser beam has been disclosed for recording, it is possible to use an electron beam or an ion beam instead of the laser beam in accordance with the present invention.

We claim:

1. An information recording apparatus for recording information by energy beam irradiation, comprising:

a laser beam source for producing a laser beam;

a laser driver to drive the laser beam;

a recording waveform generator to generate the recording waveform; and means for recording a recording signal and a dummy signal added to at least a leading or trailing side of the recording signal, wherein a duty ratio of the dummy signal is not greater than 50%, and wherein a recording start position of a combined recording signal and dummy signal is shifted at random.

2. An information recording apparatus according to claim 1, wherein a maximum shift width of the recording start position is shorter than the length of the leading or trailing side of the recording signal.

3. An information recording apparatus according to claim 1, wherein a duty ratio of the dummy signal is not greater that 25%.

4. An information recording apparatus according to claim 1, wherein the maximum shift width of the recording start position is in range of 1/20 to 1/2 of the length of the leading or trailing side of the recording signal.

* * * * *